US007421274B1

United States Patent
Hraby et al.

(10) Patent No.: US 7,421,274 B1
(45) Date of Patent: Sep. 2, 2008

(54) MOBILE ELECTRONIC APPLIANCE WITH A RADIO INTERFACE

(75) Inventors: Guenther Hraby, Pressbaum (AT); Peter Karner, Kirchberg (AT); Werner Schladofsky, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 253 days.

(21) Appl. No.: 10/110,528

(22) PCT Filed: May 31, 2000

(86) PCT No.: PCT/DE00/01794

§ 371 (c)(1),
(2), (4) Date: Apr. 15, 2002

(87) PCT Pub. No.: WO01/28109

PCT Pub. Date: Apr. 19, 2001

(30) Foreign Application Priority Data

Oct. 14, 1999 (DE) ................................ 199 49 609

(51) Int. Cl.
*H04Q 7/20* (2006.01)

(52) U.S. Cl. .............................. 455/456.1; 342/357.07; 342/357.09

(58) Field of Classification Search ................. 455/404, 455/521, 449, 456, 100, 115, 95, 456.1; 701/213, 701/300, 50; 342/357.07, 357.09
See application file for complete search history.

(56) References Cited

U.S. PATENT DOCUMENTS

| 5,825,327 | A | | 10/1998 | Krasner |
| 5,959,580 | A | * | 9/1999 | Maloney et al. ............. 342/457 |
| 6,085,135 | A | * | 7/2000 | Steckel ......................... 701/50 |
| 6,115,596 | A | * | 9/2000 | Raith et al. ............... 455/404.2 |
| 6,298,306 | B1 | * | 10/2001 | Suarez et al. ................ 701/213 |

FOREIGN PATENT DOCUMENTS

| GB | 2 325 592 A | 11/1998 |
| WO | WO 98/57824 | 12/1998 |
| WO | WO 99/27716 | 6/1999 |

* cited by examiner

*Primary Examiner*—Joseph Feild
*Assistant Examiner*—Phuoc H Doan
(74) *Attorney, Agent, or Firm*—Bell, Boyd & Lloyd LLP

(57) ABSTRACT

A mobile electronic device with a peripheral unit in which a configuration selection is provided in which operating configurations intended for a radio interface of the peripheral unit are allocated to locations, the location information of a position finding device can be supplied to the configuration selection and the latter is set up for providing the operating configurations of the base, which are associated with the current location, to the radio interface in accordance with the location information.

19 Claims, 1 Drawing Sheet

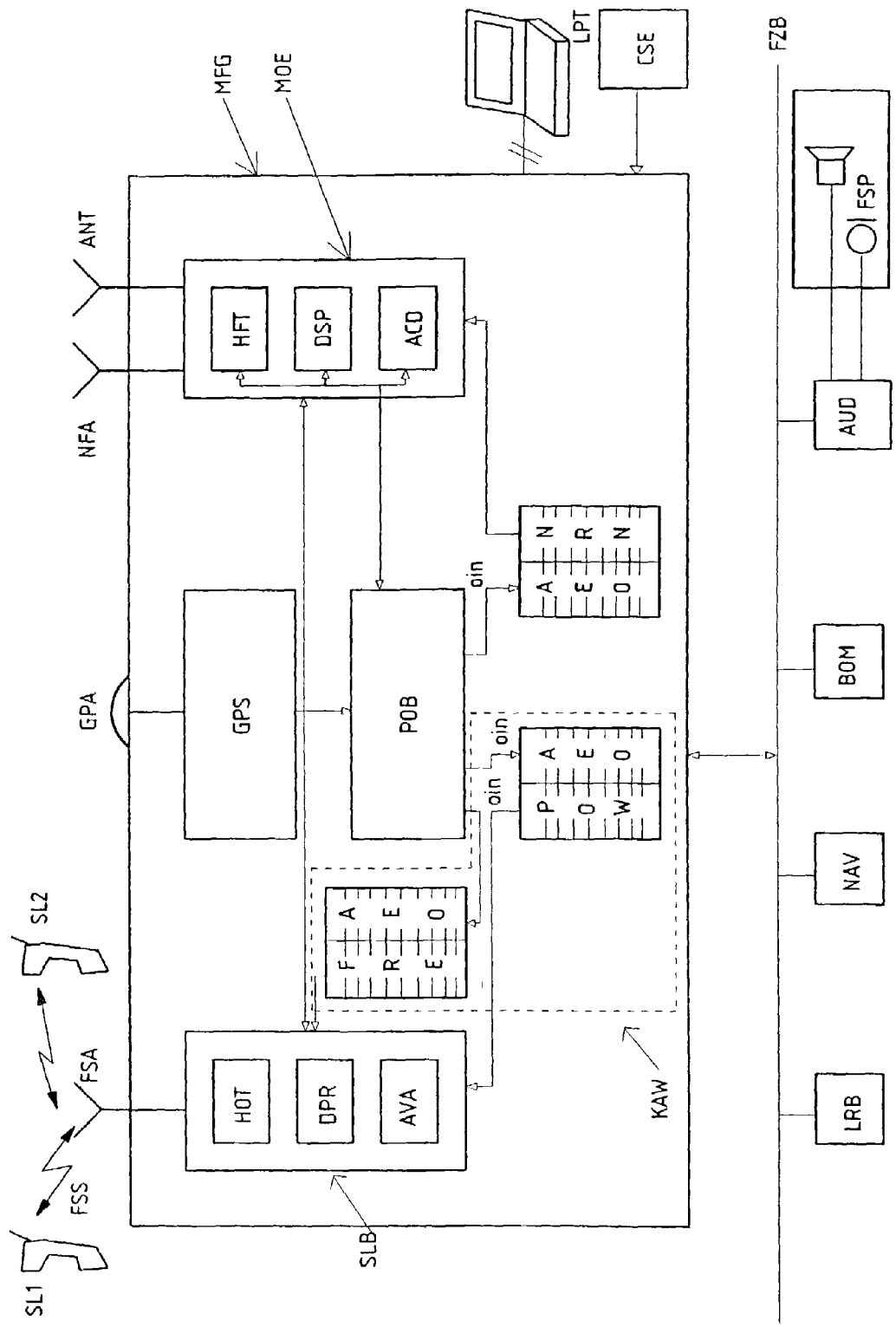

MOBILE ELECTRONIC APPLIANCE WITH A RADIO INTERFACE

CLAIM FOR PRIORITY

This application claims priority to International Application No. PCT/DE00/07194 which was published in the German language on Apr. 19, 2001.

TECHNICAL FIELD OF THE INVENTION

The invention relates to a mobile electronic device, an in particular, to a mobile electronic device with at least one peripheral unit associated with the device via a radio interface and with a position finding device supplying location information with respect to the location of the device.

BACKGROUND OF THE INVENTION

Mobile electronic devices, such as car radio devices, commonly have one or more cordless handsets "connected" thereto via a radio interface. This allows, for example, passengers to telephone using the cordless handsets. Naturally, the cordless handsets include a receiver capsule and a microphone capsule. The mobile electronic devices may also take the form of entertainment electronics to which other peripheral devices such as printers, input/output devices, etc. are connected via radio interfaces.

When such mobile electronic devices are used internationally, there are different national regulations for the permissible frequency range of the radio interface. For example, the ISM band in the frequency range from 2400 to 2483 MHz is used in various countries, but this frequency range can only be used to a limited extent in some countries, e.g. currently only from 2446 to 2454 MHz in France. It is also possible that only a selection of particular, precisely defined channels is permitted in some countries. The same considerations apply to the different regulations with regard to the maximum permissible transmitting power, e.g. 20 mW or 50 mW etc.

When crossing borders with a device, particularly in a motor vehicle or in a boat, it is necessary to adapt the frequency range or, respectively, the channels or the transmitting power of the radio interface to the national regulations in order to continue with operation of the mobile electronic device.

In the text which follows, the possible modes of the radio interface such as frequency/channel range, transmitting power, modulation etc. are combined in the term "operating configuration".

SUMMARY OF THE INVENTION

The invention generally relates to devices which are suitable for being used without problems in varying countries.

In one embodiment of the invention, there is a mobile electronic device including a configuration selection provided in which operating configurations intended for the radio interface are allocated to locations, the location information of the position finding can be supplied to the configuration selection and the latter is set up for providing the operating configurations allocated to the current location to the base of the radio interface in accordance with the location information.

The invention ensures that when borders of countries are crossed, or when the regulations change, automatic adaptation to the national regulations can take place. This is why the location information is linked to the operating configurations in the preferred embodiment.

If the device includes a mobile radio, e.g. according to the GSM standard or is constructed as such a one, it may be of advantage if the position finding device is set up for evaluating a country code, sent along by base stations of the mobile radio network, as location information.

In one aspect of the invention, the device has a navigation receiver, for example a satellite navigation receiver for determining the location information. Satellite navigation receivers are commonly integrated in many devices or the devices can access such a receiver which, for example, applies to mobile radios in cars with ground navigation devices.

Devices in which the peripheral unit is a cordless handset are preferable.

It is advantageous if the operating configurations include national frequencies or frequency ranges of the radio interface. It may also be suitable if the operating configuration includes national, maximum permissible transmission powers of the radio interface.

In another embodiment of the invention, the device includes an emergency number memory with emergency numbers allocated to locations and the location information is used for selecting national emergency numbers. This type of construction makes it possible to select the correct emergency numbers, for example in the case of automatic emergency call triggering by a crash sensor.

BRIEF DESCRIPTION OF THE DRAWINGS

In the text which follows, the invention and other advantages will be explained in greater detail by referring to the drawing.

FIG. 1 illustrates an exemplary embodiment of the invention, implemented as a mobile telephone in a car.

DETAILED DESCRIPTION OF THE PREFERRED EMBODIMENTS

The exemplary embodiment according to the invention is explained using a mobile radio MFG installed in a motor vehicle. This mobile radio MFG has a mobile radio unit MOE which includes an RF section HFT, a digital signal processor DSP and audio coding/decoding in the usual manner. The mobile radio unit can operate, for example, in accordance with the familiar GSM standard. Apart from a usual antenna ANT, an emergency antenna NFA is also provided which is intended to still make radio traffic possible in the case of a destruction of the actual antenna ANT due to an accident. The mobile radio MFG also includes a cordless base SLB with an RF part HOT, a digital processor TPR and audio processing AVA and with an antenna FSA, where the cordless base SLB can be connected to one, or to two in the present case, cordless handsets SL1, SL2 via a radio interface FSS. Generally, a peripheral device can be connected via the radio interface FSE. In the present case, however, it should be possible for a fellow passenger or other passengers of the motor vehicle to conduct telephone conversations via the cordless handsets SL1, SL2.

The mobile radio is connected in manner understood by the skilled artisan via a vehicle bus FZB to other peripheral units such as a steering wheel operating unit LRB, a navigation device NAV, an on-board monitor BOM and an audio controller AUD which also provides for hands-free talking with the aid of a hands-free device FSP. This is of importance particularly for the driver of the motor vehicle, whereas other passengers can preserve the confidentiality of the conversations with the aid of a cordless handset SL1, SL2.

As can be seen in the FIG. 1, a portable personal computer LPD or the like can be connected via another interface, e.g. an RS-232 interface, and, in addition, the signal from a crash sensor CSE is conducted to the mobile radio MFG.

In the present embodiment, the mobile radio MFG includes a satellite navigation receiver GPS with an antenna GPA for position finding. Such navigation receivers are frequently used in conjunction with a navigation system NAV, where corresponding information, possibly in the format of a map, can be provided for the driver on the on-board monitor BOM. It is of secondary importance for the consideration in conjunction with the invention whether the satellite navigation receiver GPS is physically located in the mobile radio MFG or at another place in the vehicle.

In another embodiment, a configuration selection KAW is provided in which operating configurations intended for the radio interface are allocated to locations AEO. In this case, the locations AEO are allocated to a number of frequencies FRE and, on the other hand, the locations AEO are allocated to transmitting powers POW of the radio interface FSS. A location information oin is supplied to the configuration selection KAW by a position finding device POB. Depending on the type of location information oin, a particular frequency range or a particular channel number is determined for the radio interface FSE and the same applies to the permissible transmitting power POW of the radio interface FSS. The location information oin is preferably country-related, "country" being understood to be a region having particular regulations with regard to the radio interface FSS. To obtain this location information oin, the satellite navigation system GPS which supplies a corresponding signal to the position finding device POB can be used in the present case. Using the co-ordinates, the position finding device POB can determine which country the vehicle is located in and perform a corresponding adaptation of the radio interface FSS to the law in force by the location information oin.

In another embodiment, the location information is obtained using the mobile radio unit MOE since, for example, in a GSM system, the respective base stations automatically send along a country code or, respectively, such a country code can be interrogated by means of a standard instruction. If it is found, therefore, that the subject mobile electronic device is in a country in which, for example, not all of the frequency range of the ISM band for the radio interface FSS from 2400 to 2483 MHz is permitted, the range is automatically restricted in accordance with the legal requirements.

The position finding device POB, which obtains its information either from the navigation receiver GPS or from the mobile radio unit MOE, and preferably from both devices, can also be used for selecting emergency numbers NRN. The numbers NRN are also shown in a memory, nationally on the basis of the locations AEO which are given by the location information oin. Such emergency numbers can either be triggered manually or dialed automatically in the case of an accident, possibly triggered by the crash sensor CSE, as a result of which an emergency number is dialed even when vehicle passengers are unconscious. It can also be provided in this case that the current position data are forwarded to the emergency number via the satellite navigation system GPS.

Configuring the radio interface FSS for the requirements of the respective country, which is normally necessary, is not required. This is a considerable relief for the vehicle owner who often does not perform or have not performed resetting of the radio interface, particularly in the case of motor vehicles which frequently pass into other countries.

The invention claimed is:

1. A mobile electronic device, comprising:

at least one peripheral unit associated with the device via a radio interface; and a position finding device supplying location information with respect to the location of the device, wherein a configuration selection is provided to operate configurations for the radio interface and which are allocated to locations, the location information of the position finding device configured for supply to the configuration selection and generated based on the position finding device assigned to the mobile electronic device, and the position finding device is configured to automatically provide the operating configurations allocated to the current location to a base of the radio interface in accordance with the location information.

2. The mobile electronic device as claimed in claim 1, further comprising a navigation receiver to determine the location information.

3. The mobile electronic device as claimed in claim 1, wherein the peripheral unit is a cordless handset.

4. The mobile electronic device as claimed in claim 1, wherein the operating configurations include national frequencies or frequency ranges of the radio interface.

5. The mobile electronic device as claimed in claim 1, wherein the operating configurations include national, maximum permissible transmission powers of the radio interface.

6. The mobile electronic device as claimed in claim 1, further comprising an emergency number memory with emergency numbers allocated to locations and the location information selects national emergency numbers.

7. The mobile electronic device as claimed in claim 1, further comprising a navigation receiver to determine the location information.

8. The mobile electronic device as claimed in claim 1, wherein the peripheral unit is a cordless handset.

9. The mobile electronic device as claimed in claim 2, wherein the peripheral unit is a cordless handset.

10. The mobile electronic device as claimed in claim 1, wherein the operating configurations include national frequencies or frequency ranges of the radio interface.

11. The mobile electronic device as claimed in claim 2, wherein the operating configurations include national frequencies or frequency ranges of the radio interface.

12. The mobile electronic device as claimed in claim 3, wherein the operating configurations include national frequencies or frequency ranges of the radio interface.

13. The mobile electronic device as claimed in claim 1, wherein the operating configurations include national, maximum permissible transmission powers of the radio interface.

14. The mobile electronic device as claimed in claim 2, wherein the operating configurations include national, maximum permissible transmission powers of the radio interface.

15. The mobile electronic device as claimed in claim 3, wherein the operating configurations include national, maximum permissible transmission powers of the radio interface.

16. The mobile electronic device as claimed in claim 4, wherein the operating configurations include national, maximum permissible transmission powers of the radio interface.

17. The mobile electronic device as claimed in claim 1, wherein the position finding device determines that the cur rent location has switched from one country to another country.

18. The mobile electronic device as claimed in claim 1, wherein the location information provided has switched from a first country location to a second country location.

19. The mobile electronic device as claimed in claim 18, wherein the operating conditions allocated correspond to operating conditions of the second country location.

* * * * *